May 12, 1970  KATASHI OITA ETAL  3,511,737
INDENTATION AND GROOVE RESISTANT COMPOSITE PANEL STRUCTURE
Filed Nov. 8, 1967  2 Sheets-Sheet 1

INVENTORS
KATASHI OITA
ROLAND E. KREIBICH
FREDERICK C. PNEUMAN
RICHARD W. CASTER
BY
ATTORNEYS

May 12, 1970     KATASHI OITA ETAL     3,511,737
INDENTATION AND GROOVE RESISTANT COMPOSITE PANEL STRUCTURE

Filed Nov. 8, 1967

INVENTORS
KATASHI OITA
ROLAND E. KREIBICH
FREDERICK C. PNEUMAN
RICHARD W. CASTER

BY
ATTORNEYS

# United States Patent Office 3,511,737
Patented May 12, 1970

3,511,737
INDENTATION AND GROOVE RESISTANT COMPOSITE PANEL STRUCTURE
Katashi Oita and Roland E. Kreibich, Seattle, Frederick C. Pneuman, Bellevue, and Richard W. Caster, Seattle, Wash., assignors to Weyerhaeuser Company, Tacoma, Wash., a corporation of Washington
Filed Nov. 8, 1967, Ser. No. 681,436
Int. Cl. B32b 3/10, 3/14, 3/16
U.S. Cl. 161—38       8 Claims

ABSTRACT OF THE DISCLOSURE

A high strength composite panel having improved impact, abrasion, indentation, and groove resistance, particularly useful in the manufacture of air cargo pallets, which has a core of softwood plywood of at least five plies, a first overlay adhesively bonded to the top and bottom surfaces of the core material, the overlay having a high tensile strength when stressed parallel and perpendicular to the plane of the panel, and a second overlay adhesively bonded to the first overlay having in addition to the properties of the first overlay, a high modulus of rupture.

BACKGROUND OF THE INVENTION

This invention broadly relates to a composite planar panel useful in a number of industrial applications, and particularly useful as a pallet material.

With the increasing volume of air freight, airlines have turned to the use of cargo pallets for rapid handling of unitized loads. These pallets are normally made of 5-ply $7/16''$ Douglas fir plywood overlaid on both surfaces with $1/8''$ tempered hardboard or a heavy phenolic resin-impregnated paper. The useful life of such pallets has been relatively short necessitating replacement every few months. The apparent cause of failure of the pallets heretofore used appears to be in the core veneer due to rolling shear and a tension perpendicular to the grain failure. The pallets used previously have also had relatively poor indentation and grooving resistance because of the low strength of the core material and the inadequate support afforded by the Douglas fir plywood core. Replacement of the pallet material every few months by the airlines has resulted in increased costs and has forced them to seek new materials having improved properties.

SUMMARY OF THE INVENTION

This invention relates to an improved composite panel structure having excellent strength characteristics. The composite panel is most useful in the manufacture of air cargo pallets and is composed of a core material of plywood overlaid on each surface with a material having a relatively high tensile strength when stressed parallel and perpendicular to the plane of the panel. Over the first overlay is adhesively bonded a hard facing material having a high modulus of rupture and ultimate tensile and compressive strength.

This invention also has as one of its objects the manufacture of air cargo pallets using the composite material described above.

DETAILED DESCRIPTION OF THE INVENTION

Figure 1:
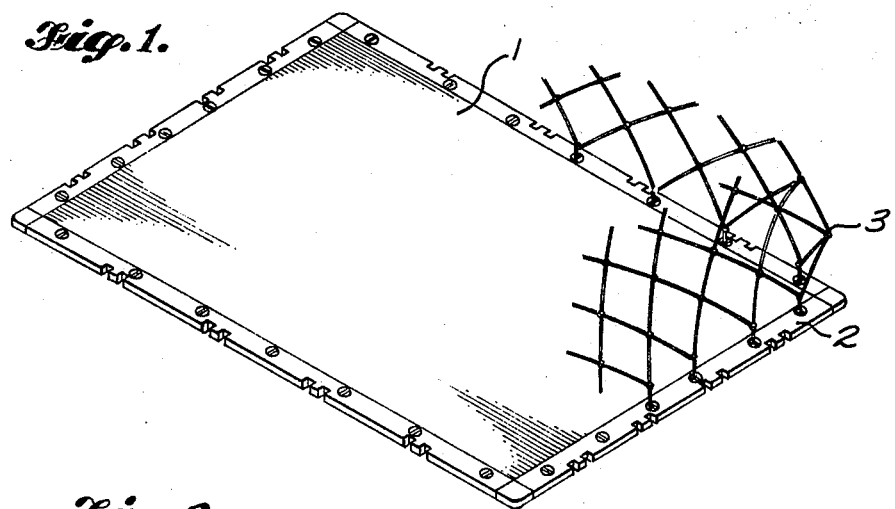
FIG. 1 is a perspective view of an air cargo pallet utilizing the material of this invention.

Referring to the drawings in more detail, FIG. 1 illustrates an air cargo pallet using the pallet material of this invention. A typical air cargo pallet comprises a pallet blank 1 to which is secured a metal frame 2, usually of aluminum, by suitable means. Netting 3 is used to secure the cargo material placed on the pallet, the netting being tied to frame 2 at spaced intervals.

The pallet material of this invention has improved indentation and groove resistance and, while it has its greatest use in the manufacture of air cargo pallets, is not limited thereto. Other applications for high strength, light weight sheet materials having high impact resistance include, for example, use as a flooring in containers, trucks, and industrial buildings where strong, abrasion and groove-resistant floors are required.

The composite panel of this invention comprises a softwood plywood core to which is adhesively bonded a first overlay having an average tensile strength perpendicular to the grain of at least 830 p.s.i. as determined by ASTM designation: D143–52(1965) and a hardness of at least 1200 pounds as determined by the same ASTM test designation. To the first overlay is adhesively bonded a second overlay material having a modulus of rupture in flexure and an ultimate tensile and compressive strength of at least 14,600 p.s.i. in the machine direction and 13,000 p.s.i. normal to the machine direction, a modulus of elasticity of at least $1.1 \times 10^6$ p.s.i. in the machine and cross directions, and an Izod impact toughness value of at least 0.60 foot pound per inch in the machine and cross directions.

The pallet blank is preferably constructed using a plywood core having no joints and first and second overlays having no splices or joints. Provided that good joints and/or splices are made, the composite panel structure is capable of good overall strength. Where a finger joint is necessary it should meet the requirements set out on page 19, Table of American Plywood Association Laboratory Report 100 entitled "Finger Joints—Design and Tests" by T. J. Patterson (1964).

Figure 2:
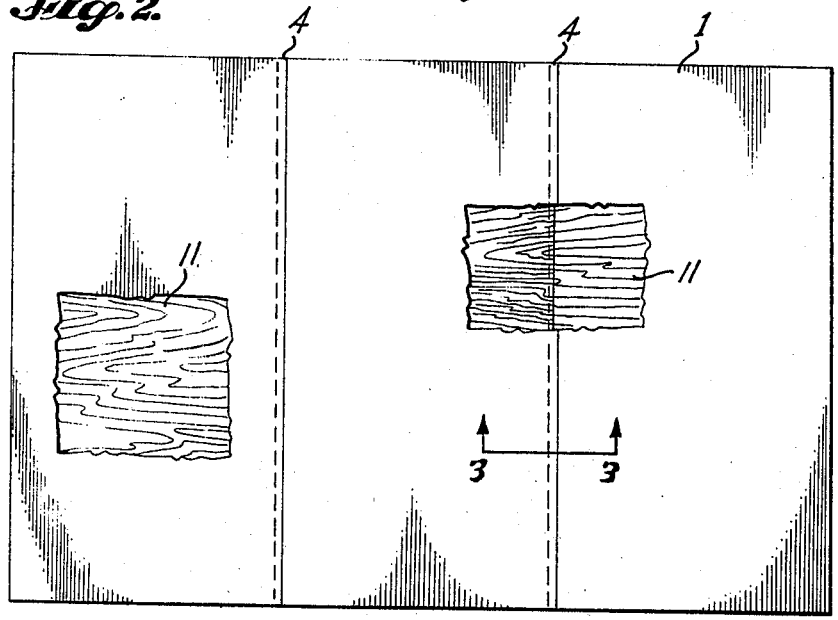
FIG. 2 is a top view of the construction of the pallet blank of this invention wherein the finger joint joining the core portion and the high strength overlays are spliced together.
Figure 3:
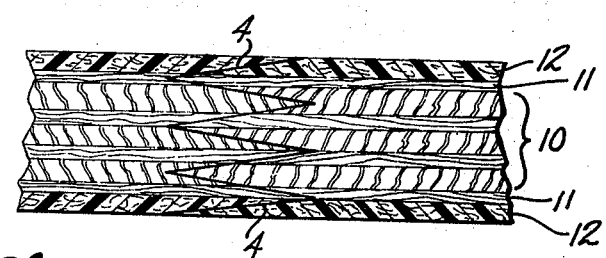
FIG. 3 is a section along line 3—3 of FIG. 2.
Figure 4:
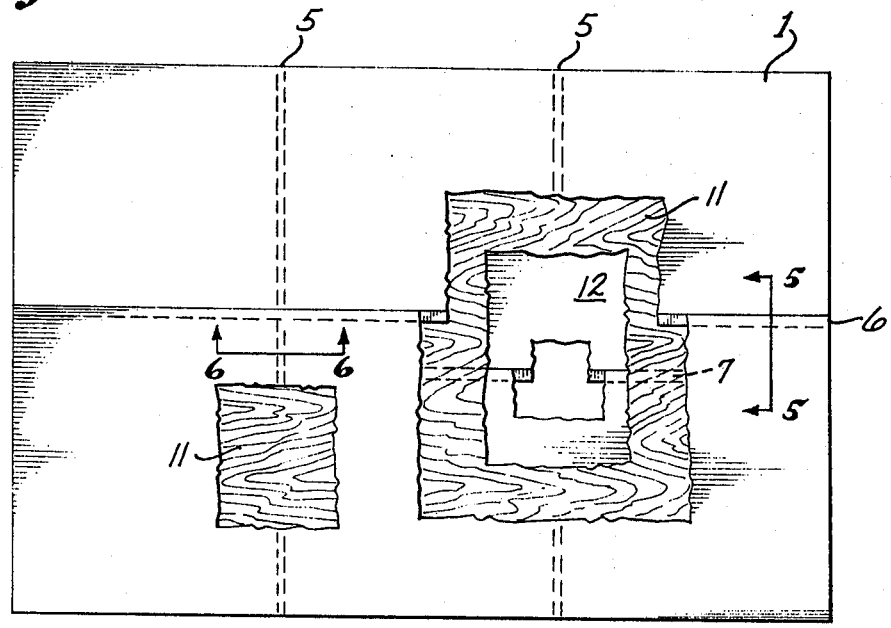
FIG. 4 is a top view of the construction of the pallet blank of this invention wherein the finger joint joining the core and the splices joining sections of the hard facing overlay are separate.
Figure 5:
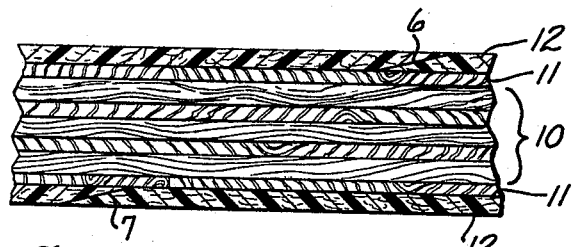
FIG. 5 is a sectional view along line 5—5 of FIG. 4.
Figure 6:
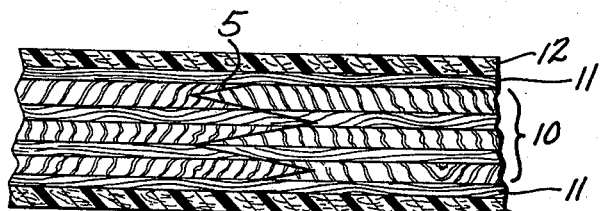
FIG. 6 is a sectional view along line 6—6 of FIG. 4.

Referring to FIG. 2, the pallet blank can be constructed by joining two or more of the composite panels of this invention by suitable finger joints 4 as shown. Joining sections of the composite material by means of finger joints gives a panel having good overall strength with little or no loss of strength across the joint. Scarf joints can also be used. Referring to FIG. 3, it can be seen that the composite structure depicted is composed of a plywood core of five plies 10, a first overlay 11 having primary strength properties normal to the joint adhesively bonded to the top and bottom surfaces of the plywood core 10, and a second overlay 12 having primary strength properties normal to the joint adhesively bonded to each of the first overlays 11. The composite panels are joined together by suitable joints, such as finger joints 4, to give an air cargo pallet deck, flooring, or any other material of the length and width desired. The second overlay material in FIGS. 2 and 3 is spliced as part of the finger joint. It has been found that some strength advantages can be obtained by splicing either or both the first and second overlays apart and separate from the finger joint joining the plywood core together. This is shown by FIGS. 4 and 5 and 6 wherein the plywood core material is joined together by finger joints 5 and the second overlay is spliced separate as shown by splices 6 and 7. It is also advantageous that splice 6 on the top surface of the panel be offset from splice 7 on the bottom surface. Better strength properties are obtained wih a panel of the configuration of FIG. 4. A single panel lay-up with no joints would give even greater strength advantages.

The plywood core material should be a good exterior grade of plywood, preferably of 5 or more plies, with the plies of fairly uniform thickness. For air cargo pallet material a five ply marine grade Douglas fir plywood (PS 1–66) constructed of all 1/12" veneer (B–B face), all 1/10" veneer, or alternating 1/8", 1/10" veneer, is preferably used. The plywood core material should not have a substantial number of core gaps as this weakens the composite structure. In addition, there should be no unplugged or open knots on the face ply. The plywood construction should not contain any veneer thicker than 1/6", and thicknesses of 1/8" or less are preferred. More than five plies may be used in the core material as, for example, a softwood plywood of seven plies. The plywood is laid up as usual in that the grain directions of the plies alternate in order to balance the plywood structure.

The first overlay functions to give adequate backing strength to the second overlay to protect it from indentation and prevents tension perpendicular failures between the overlay and the plywood core. The first overlay is preferably a hardwood veneer having a high tensile strength and other strength properties when stressed in tension perpendicular to the grain. The first overlay should have a thickness of at least 0.30" and preferably a thickness ranging from .030–0.040". Hardwood veneers which can be used include those of white ash, American beech, sweet birch, cedar elm, winged elm, honey locust, red pin oak, red water oak, white overcup oak, swamp white oak, and yellow birch. Yellow birch is preferred because of its availability and strength properties. The first overlay material, however, should have tensile strength and hardness of at least 830 p.s.i. and 1200 pounds respectively as determined by ASTM designation D143–52 (1965). Preferably the grain direction of the hardwood veneer overlay should be perpendicular to the grain direction of the face ply of the plywood core. Also it is preferred that the hardwood veneer be continuous over the finger joint in the core material if such a joint is needed.

The second overlay material 12 should have a modulus of rupture in flexure and an ultimate tensile and compressive strength of at least 14,600 p.s.i. in the machine direction and 13,000 p.s.i. normal to the machine direction, a modulus of elasticity of at least $1.1 \times 10^6$ p.s.i. in the machine and cross directions, and an Izod impact toughness value of at least 0.60 foot pound per inch in the machine and cross directions. A material found suitable which meets the requirements set out is a phenolic resin-impregnated paper sold under the trade name Phenrock by Fabricon Products, a division of Eagle-Picher Industries, Incorporated. This particular material is made by heating under pressure multiple layers of phenol formaldehyde-impregnated kraft paper. The end product has properties making it useful in manufacture of the composite structure of this invention. Other materials such as fabric laminates having strength and surface properties similar to that of the preferred phenolic resin-containing material may be used such as Analite, a resin-impregnated vulcanized fiber sold by National Vulcanized Fiber Company; Synthane, a phenolic resin-impregnated paper laminate sold by Synthane Corporation; or Textolite, a phenolic-resin-impregnated paper sold by General Electric. The second overlay should have a minimum thickness of 1/32 inch and preferably a thickness of at least 1/16 inch.

The first and second overlays can be adhesively bonded to the plywood core with conventional adhesives such as resorcinol-formaldehyde, phenol-formaldehyde, epoxy, or other conventional adhesives.

The composite structure of this invention has about twice the strength of a pallet material composed of 5-ply 7/16" Douglas fir plywood overlaid on both surfaces with 1/8" tempered hardboard in regard to modulus of rupture and modulus of elasticity. In addition, ball indentation is only about one-fourth of that of prior art pallet materials. These improvements are of very great significance and have not been previously obtainable in a product of this type.

The following examples serve to illustrate manufacture and strength properties of the composite structure of this invention but are not intended to be limiting in any manner.

Example I

A piece of 5-ply marine grade Douglas fir plywood constructed of all 1/12 inch veneer (B—B face) was sanded to 0.375 inch thickness. A resorcinol-formaldehyde adhesive was applied to the plywood face and to one side of a piece of 0.063 inch birch veneer. The birch veneer was then placed on the top surface of the plywood core. An additional amount of resorcinol adhesive was applied to the top surface of the birch veneer and to the bottom surface of a piece of phenolic resin-impregnated paper having a thickness of 0.093 inch. The resin-impregnated paper was then applied to the top surface of the birch veneer. The entire structure was then turned over and the process repeated with the birch veneer and the resin-impregnated paper on the bottom surface of the plywood core. The composite structure was then pressed and cured at room temperature for about 16 hours using the vacuum bag technique. Composite materials made according to the above description were then tested and showed properties as described in Table I:

TABLE I

| Panel No. | Plywood Core Thickness, Inches | Plywood Core Type | First Overlay Thickness, Inches | First Overlay Type | First Overlay Grain Direction [e] | Second Overlay Thickness, Inches | Second Overlay Type | MOR,[d] p.s.i. | MOE,[d] ×10³ | Ball Penetration Depth,[b] Inches | Groove Test [c] Penetration, Inches | Drag, Lb. |
|---|---|---|---|---|---|---|---|---|---|---|---|---|
| A | 0.375 | 5 ply Douglas fir | 0.063 | Birch | ⊥ | 0.093 | [a] | 16,370 | 1,644 | 0.091 | 0.016 | 106 |
| B | 0.375 | do | 0.063 | do | = | 0.093 | [a] | 15,960 | 1,474 | 0.094 | 0.011 | 87 |
| C | 0.375 | do | 0.063 | do | ⊥ | 0.093 | [a] polyurethane coated | 16,370 | 1,644 | 0.091 | 0.003 | 88 |
| D | 0.375 | do | 0.063 | do | = | 0.093 | do | 15,960 | 1,474 | 0.094 | 0.003 | 85 |

[a] Phenolic resin-impregnated paper made by Fabricon Products and sold under the trade name "Phenrock."
[b] 750 lb. load, 0.44" dia. ball.
[c] 540 lb. load, 0.75" dia. ball.
[d] Based on a homogenous section.
[e] As referenced to the length dimension of the test sample.

As can be seen, the strength properties of the composite panel are essentially independent of the grain direction of the hardwood veneer first overlay, although some advantage can be obtained by bonding the first overlay to the plywood core with its grain direction perpendicular to the grain direction of the surface ply of the plywood core. Panel Nos. C and D were coated with a commercially obtainable polyurethane coating to increase their resistance to abrasion.

Five other composite panels were made according to prior art techniques, as shown in Table II:

TABLE II

| Panel No. | Plywood Core | | First Overlay | | | Second Overlay | | MOR,[c] p.s.i. | MOE,[c] ×10³ | Ball Penetration[f] Depth, Inches | Groove Test[g] | |
|---|---|---|---|---|---|---|---|---|---|---|---|---|
| | Thickness, Inches | Type | Thickness, Inches | Type | Grain Direction[d] | Thickness, Inches | Type | | | | Penetration, Inches | Drag, Lb. |
| E | 0.625 | 7 ply Douglas fir | 0.10 | None | | 0.062 | [a] | 11,330 | 1,823 | 0.19 | 0.05 | 188 |
| F | 0.625 | do | 0.10 | do | = | 0.062 | [a] | 11,290 | 1,088 | 0.22 | 0.08 | 75 |
| G | 0.44 | 5 ply Commercial Birch Plywood | 0.03 | do | = | 0.10 | [a] | 10,650 | 1,209 | 0.10 | 0.02 | 65 |
| H | 0.625 | 7 ply Douglas fir | 0.10 | do | = | 0.062 | [b] | 10,120 | 1,140 | | 0.06 | 143 |
| I | 0.375 | 5 ply Douglas fir | 0.08 | do | = | 0.125 | [c] | 7,932 | 880 | | 0.040 | 155 |

[a] Phenolic resin-impregnated paper made by Fabricon Products and sold under the trade name "Phenrock."
[b] Resin-impregnated vulcanized fiber product manufactured by National Vulcanized Fiber.
[c] Tempered hardboard sold under the trade name "Lebanite" by U.S. Plywood.
[d] As referenced to the length dimension of the test sample.
[e] Based on a homogenous section.
[f] 750 lb. load, 0.44" dia. ball.
[g] 540 lb. load, 0.75" dia. ball.

From the results shown in Tables I and II, it can be readily seen that the indentation and grooving resistance of the composite panel of the instant invention is far superior to that of products made according to the prior art. Specifically, a 7-ply Douglas fir panel overlaid with 0.062 inch phenolic resin-impregnated paper had a modulus of rupture considerably less than a panel having a 5-ply Douglas fir core overlaid with .062 inch birch veneer and a second overlay of 0.093 inch phenolic resin-impregnated paper.

Example II

An air cargo pallet composite panel, 90" x 125", was made in the manner described in Example I using 5-ply marine grade Douglas fir plywood sanded to a thickness of 0.49". Two finger joints parallel to the width dimension were present. The grain direction of the surface ply was parallel to the width dimension. A first overlay of 1/26" birch veneer was adhesively secured to the top and bottom surfaces of the plywood core with its grain direction perpendicular to the grain direction of each of the surface plies of the plywood core. The birch veneer was continuous over the finger joints of the plywood core. A second overlay of phenolic resin-impregnated kraft paper (Phenrock), 0.062" in thickness, was adhesively bonded to each of the birch veneer surfaces utilizing scarf joints as shown in FIG. 4. The machine direction of the second overlay was parallel to the grain direction of the first overlay. The pallet material showed the following average strength properties:

TABLE III.—AVERAGE STRENGTH PROPERTIES REFERENCED TO PALLET DIMENSIONS (a)

| Property | Parallel to Long Direction | | Parallel to Short Direction | |
|---|---|---|---|---|
| | At Finger Joint | Away From Finger Joint | At Phenrock Scarf Joint | Away From Phenrock Scarf Joint |
| Modulus of rupture in flexure p.s.i. | 14,775 | 16,786 | 9,492 | 11,810 |
| Ultimate tensile strength | 8,135 | 8,215 | 5,019 | 6,024 |
| Ultimate compressive strength | 6,154 | 7,151 | 6,679 | 6,744 |
| Effective modulus of elasticity p.s.i. | 1.537×10⁶ | | 1.057×10⁶ | |

(a) Computed based on homogeneous section properties.

Example III

Three birch-face plywood panels prepared as described in Example I were finger jointed together and overlaid with the phenolic resin-impregnated paper as shown in FIG. 2. Because of the excellent quality of the finger joint and the strength of the phenolic resin-impregnated paper, especially in the machine direction, the modulus of rupture strength of the overlaid panel at the finger joint was essentially the same as that of the region away from the joint.

Example IV

Groove tests were carried out on composite panels made according to the instant invention (J1, J2) and those of the prior art (K1, K2, L1, L2). These tests were conducted by rolling across the panel being tested a 0.75" dia. ball on which was imposed a measured load. Grooving tests were run with loads of 150 lbs., 347 lbs., and 540 lbs. Depths of penetration are shown in Table IV. After grooving of the panels, cross sections of the area under each of the grooves were examined visually by sawing through the groove along its long direction. The symbol ($\perp$) means that the direction of the groove is perpendicular to the grain direction of the veneer under consideration. The groove direction and the grain direction are parallel when the symbol (=) is used.

TABLE IV.—GROOVE RESISTANCE

| Panel no. | Plywood Core | | | First Overlay | | | Second Overlay | | Depth of Penetration 0.75" dia. ball | | |
|---|---|---|---|---|---|---|---|---|---|---|---|
| | Type | Thick., In. Face Veneer | Grain Dir.[a] Face Veneer | Type | Thick., In. | Grain Dir. | Type | Thick., In. | 150 Lb. | 374 Lb. | 540 Lb. |
| J1 | 5-ply Douglas fir | 0.10 | = | Birch | 0.038 | $\perp$ | Phenrock | 0.063 | 0.000 | 0.007 | 0.025 |
| J2 | do | 0.10 | $\perp$ | do | 0.038 | = | do | 0.063 | 0.000 | 0.008 | 0.022 |
| K1 | do | 0.083 | $\perp$ | None | | | do | 0.063 | 0.007 | 0.015 | 0.045 |
| K2 | do | 0.083 | = | do | | | do | 0.063 | 0.001 | 0.028 | 0.054 |
| L1 | do | 0.083 | $\perp$ | do | | | do | 0.063 | 0.000 | 0.018 | 0.065 |
| L2 | do | 0.083 | = | do | | | do | 0.063 | 0.000 | 0.030 | 0.075 |

[a] = or $\perp$ refers to the orientation of grain direction in regard to groove direction.

With 150 pounds no significant differences are apparent. With a load of 347 pounds the panels constructed according to the instant invention showed 0.007" and 0.008" penetration as compared to an average 0.017" and 0.029" of the prior art construction as measured in the direction perpendicular and parallel to the face Douglas fir grain direction. Visual inspection of panels K and L, grooved in the direction perpendicular to the grain direction of the face veneer of the plywood core indicated shattering of the Phenrock overlay while the Phenrock overlay of panel J was in excellent condition. With the 347 lb. load in the parallel direction, panels K and L, on visual inspection, showed some Phenrock damage, and tension perpendicular failures in the face veneer of the Douglas fir plywood core. Panel J showed slight Phenrock damage but no substantial veneer damage.

With the 540 lb. load, panels K and L showed 0.045" penetration in the perpendicular direction and 0.054" in the parallel direction as compared to the 0.025" and 0.022" perpendicular and parallel penetrations of panel J. Visual inspection of panels K and L showed damage to the Phenrock overlay and damage to the face veneer. Only slight veneer damage could be detected in panel J.

The examples given above clearly indicate the improved properties of the composite structure of the instant invention over those known heretofore.

What is claimed is:

1. An indentation and groove resistant composite material comprising:
   (a) a softwood plywood core,
   (b) a first overlay adhesively bonded to the top and bottom surfaces of the core, the overlay having an average tensile strength perpendicular to the grain of at least 830 p.s.i. and a hardness of at least 1200 pounds as determined by ASTM designation D143–52 (1965), and
   (c) a second overlay material adhesively bonded to the first overlay, the second overlay material having a modulus of rupture in flexure and an ultimate tensile and compressive strength of at least 14,600 p.s.i. in the machine direction and 13,000 p.s.i. normal to the machine direction, a modulus of elasticity of at least $1.1 \times 10^6$ p.s.i. in the machine and cross directions, and an Izod impact toughness value of at least 0.60 foot pound per inch in the machine and cross directions.

2. The material according to claim 1 wherein the softwood plywood core comprises at least five plies adhesively bonded together, each of the plies having a thickness not greater than 1/6 inch.

3. The material according to claim 2 wherein the first overlay is a hardwood veneer having a minimum thickness of about 0.030 inch.

4. The material according to claim 3 wherein the second overlay is a phenolic resin-impregnated paper having a minimum thickness of about 0.030 inch.

5. The material according to claim 1 wherein the plywood core contains at least five plies.

6. Panel of claim 1 in which the plywood core comprises subpanels formed into a unitary structure by jointing, the first and second overlays comprising spliced sheets, the splices of which are displaced from each other and from the core joints.

7. The panel of claim 6 in which the splices of the first and second overlays are further displaced between the top and bottom surface of the core.

8. An indentation-resistant composite panel comprising:
   (a) a softwood plywood core of at least five plies of substantially uniform thickness, each of the plies having a thickness of less than 1/8 inch,
   (b) a first overlay of birch veneer adhesively bonded to the top and bottom surfaces of the plywood core, the veneer having at least a thickness ranging from between 0.030–0.040", and
   (c) a second overlay of phenolic resin-impregnated paper adhesively bonded to the first overlay and having a thickness of at least 1/16 inch.

References Cited
UNITED STATES PATENTS

| | | | |
|---|---|---|---|
| 1,550,065 | 8/1925 | Elmendorf | 161—38 |
| 3,028,285 | 4/1962 | Rogers | 161—268 XR |
| 3,394,513 | 7/1968 | Nerem | 52—309 |
| 3,229,433 | 1/1966 | Miles | 52—615 XR |

PHILIP DIER, Primary Examiner

U.S. Cl. X.R.

52—309, 615; 108—51; 161—41, 46, 268